(12) United States Patent
Mathew et al.

(10) Patent No.: US 8,972,439 B2
(45) Date of Patent: Mar. 3, 2015

(54) METHOD AND SYSTEM FOR EXPLORING OBJECTS IN A DATA DICTIONARY

(75) Inventors: Reena Mathew, San Francisco, CA (US); Zuye Zheng, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 318 days.

(21) Appl. No.: 13/106,760

(22) Filed: May 12, 2011

(65) Prior Publication Data

US 2011/0282899 A1 Nov. 17, 2011

Related U.S. Application Data

(60) Provisional application No. 61/395,654, filed on May 13, 2010.

(51) Int. Cl.
*G06F 7/00* (2006.01)
*G06F 17/30* (2006.01)

(52) U.S. Cl.
CPC ................ *G06F 17/30398* (2013.01)
USPC ........................................................ 707/769

(58) Field of Classification Search
USPC ........... 707/769, 758, 760, 999.003–999.005, 707/756, 955, 960; 715/762
See application file for complete search history.

(56) References Cited

U.S. PATENT DOCUMENTS

| | | |
|---|---|---|
| 5,715,450 A | 2/1998 | Ambrose et al. |
| 5,821,937 A | 10/1998 | Tonelli et al. |
| 5,831,610 A | 11/1998 | Tonelli et al. |
| 5,873,096 A | 2/1999 | Lim et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,549,908 B1 | 4/2003 | Loomans |
| 6,553,563 B2 | 4/2003 | Ambrose et al. |
| 6,574,635 B2 | 6/2003 | Stauber et al. |
| 6,577,726 B1 | 6/2003 | Huang et al. |
| 6,604,117 B2 | 8/2003 | Lim et al. |
| 6,604,128 B2 | 8/2003 | Diec |

(Continued)

*Primary Examiner* — Hung T Vy
(74) *Attorney, Agent, or Firm* — Dergosits & Noah LLP; Todd A. Noah

(57) ABSTRACT

Mechanisms and methods for exploring objects in a data dictionary may enable embodiments to provide a simple and efficient tool for understanding dependencies between entities. The ability to provide a visual format for representing dependency information of entities may enable database developers to efficiently explore objects in a data dictionary and better understand the dependencies of entities in the database. In an embodiment, methods for exploring objects in a database can be applied to multi-tenant database systems.

16 Claims, 11 Drawing Sheets

(56) References Cited

U.S. PATENT DOCUMENTS

| | | |
|---|---|---|
| 6,609,150 B2 | 8/2003 | Lee et al. |
| 6,665,648 B2 | 12/2003 | Brodersen et al. |
| 6,665,655 B1 | 12/2003 | Warner et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,774,366 B2 | 8/2010 | Fisher et al. |
| 7,949,684 B2 | 5/2011 | Brooks et al. |
| 8,112,445 B2 | 2/2012 | Weissman et al. |
| 8,364,623 B1 * | 1/2013 | Bunker et al. ............... 706/47 |
| 2001/0034733 A1 * | 10/2001 | Prompt et al. ............. 707/102 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0223022 A1 | 10/2005 | Weissman et al. |
| 2006/0206834 A1 | 9/2006 | Fisher et al. |
| 2008/0082540 A1 | 4/2008 | Weissman et al. |
| 2008/0092068 A1 * | 4/2008 | Norring et al. ............. 715/762 |
| 2008/0201701 A1 | 8/2008 | Hofhansl et al. |
| 2008/0301120 A1 * | 12/2008 | Zhu et al. ................. 707/5 |
| 2010/0205227 A1 | 8/2010 | Weissman et al. |
| 2010/0223284 A1 | 9/2010 | Brooks et al. |
| 2010/0299608 A1 | 11/2010 | Fisher et al. |
| 2011/0022642 A1 * | 1/2011 | deMilo et al. ............. 707/805 |
| 2011/0071995 A1 | 3/2011 | Fisher et al. |
| 2011/0071996 A1 | 3/2011 | Fisher et al. |
| 2011/0072385 A1 | 3/2011 | Fisher et al. |
| 2011/0072386 A1 | 3/2011 | Fisher et al. |
| 2011/0072387 A1 | 3/2011 | Fisher et al. |
| 2011/0196883 A1 | 8/2011 | Brooks et al. |
| 2011/0202508 A1 | 8/2011 | Brooks et al. |
| 2011/0202911 A1 | 8/2011 | Brooks et al. |
| 2011/0246417 A1 | 10/2011 | Maya et al. |
| 2011/0276610 A1 | 11/2011 | Hossain et al. |
| 2011/0276674 A1 | 11/2011 | Jensen-Horne et al. |
| 2011/0276693 A1 | 11/2011 | Jensen-Horne et al. |
| 2011/0276890 A1 | 11/2011 | Jensen-Horne et al. |
| 2011/0276892 A1 | 11/2011 | Jensen-Horne et al. |
| 2011/0282899 A1 * | 11/2011 | Mathew et al. ............. 707/769 |
| 2011/0283163 A1 | 11/2011 | Zheng |
| 2011/0283181 A1 | 11/2011 | Waite et al. |
| 2011/0283266 A1 | 11/2011 | Gallagher et al. |
| 2011/0283267 A1 | 11/2011 | Waite et al. |
| 2011/0289091 A1 | 11/2011 | Collins et al. |
| 2011/0302212 A1 | 12/2011 | Agrawal et al. |
| 2012/0041986 A1 | 2/2012 | Weissman et al. |
| 2012/0054241 A1 | 3/2012 | Brooks et al. |
| 2012/0054328 A1 | 3/2012 | Brooks et al. |
| 2012/0059807 A1 | 3/2012 | Brooks et al. |
| 2012/0059862 A1 | 3/2012 | Brooks et al. |
| 2012/0066160 A1 | 3/2012 | Jagota |
| 2012/0084266 A1 | 4/2012 | Brooks et al. |
| 2012/0110020 A1 | 5/2012 | Weissman et al. |
| 2012/0131555 A1 | 5/2012 | Hossain et al. |
| 2012/0144374 A1 | 6/2012 | Gallagher et al. |
| 2012/0239629 A1 | 9/2012 | Brooks et al. |
| 2012/0246120 A1 | 9/2012 | Brooks et al. |
| 2012/0266229 A1 | 10/2012 | Simone et al. |
| 2012/0310989 A1 | 12/2012 | Weissman et al. |
| 2012/0317146 A1 | 12/2012 | Brooks et al. |
| 2012/0330644 A1 | 12/2012 | Giraudy et al. |
| 2012/0331016 A1 | 12/2012 | Janson et al. |
| 2013/0007062 A1 | 1/2013 | Dutta et al. |
| 2013/0031053 A1 | 1/2013 | Tobin et al. |
| 2013/0031054 A1 | 1/2013 | Tobin et al. |
| 2013/0031141 A1 | 1/2013 | Tobin et al. |
| 2013/0031491 A1 | 1/2013 | Tobin et al. |
| 2013/0031555 A1 | 1/2013 | Tobin et al. |
| 2013/0036406 A1 | 2/2013 | Zheng et al. |
| 2013/0036407 A1 | 2/2013 | Zheng et al. |

* cited by examiner

602 — ⊞ Entity Name, Label, Key Prefix, or Misc:

Filter Term           604 — [apexpage]           Toggle Filters Display • Show All Entities — 608, 612

| | Value |
|---|---|
| Has Activities [<>] | [True] |
| Is Custom [<>] | [True] |
| Is Workflow Enabled [<>] | [False] |
| Allows Send Email [<>] | [None] |

606

610 — [Filter]

| Name | Label | Key Prefix | Namespace |
|---|---|---|---|
| ApexPage | Visualforce Page | 066 | |
| ApexPageSecurity | Apex Page Security | 0CA | |

| Basic | Fields | Referencing Fields | Graph View |

Entity Info Fields

| Name | Label | Type | Readable | Editable | Custom | Calculated | ID |
|---|---|---|---|---|---|---|---|
| AllManagedPackageMember | AMPM Entry | AMPM | √ | | | | U#154.10ff(AllManagedPackageMember) |
| ApiVersion | Api Version | Data | √ | √ | | | U#154.4ff(ApiVersion) |
| ControllerKey | Controller Key | Data | √ | √ | | | U#154.8ff(ControllerKey) |
| ControllerType | Controller Type | Data | √ | √ | | | U#154.7ff(ControllerType) |
| CreatedBy | Created By | Created By | √ | | | | U#154.bff(CreatedBy) |
| CreatedDate | Created Date | Created Date | √ | | | | U#154.aff(CreatedDate) |
| Description | Description | Data | √ | √ | | | U#154.6ff(Description) |
| ID | Page ID | Primary Key | √ | | | | U#154.ff(Id) |
| LastModifiedBy | Last Modified By | LastUpdateBy | √ | | | | U#154.dff(LastModifiedBy) |
| LastModifiedDate | Last Modified Date | LastUpdate | √ | | | | U#154.cff(LastModifiedDate) |
| ManageableState | Manageable State | ManageableState | √ | | | | U#154.fff(ManageableState) |
| Markup | Markup | Data | √ | √ | | | U#154.9ff(Markup) |
| MasterLabel | Label | MasterLabel | √ | √ | | | U#154.5ff(MasterLabel) |
| Name | Name | Name | √ | √ | | | U#154.2ff(Name) |
| NameNorm | Name Lowercase | Data | √ | | | | U#154.3ff(NameNorm) |
| NamespacePrefix | Namespace Prefix | Namespace | √ | | | | U#154.1ff(NamespacePrefix) |
| SystemModstamp | SystemModstamp | SysModstamp | √ | | | | U#154.eff(SystemModstamp) |

FIG. 7

METHOD AND SYSTEM FOR EXPLORING OBJECTS IN A DATA DICTIONARY

CLAIM OF PRIORITY

This application claims the benefit of U.S. Provisional Patent Application 61/395,654 entitled, METHOD AND SYSTEM FOR EXPLORING OBJECTS IN A DATA DICTIONARY, by Reena Mathew et al., filed on May 13, 2010, the entire contents of which are incorporated herein by reference.

CROSS REFERENCE TO RELATED APPLICATIONS

The following commonly owned, co-pending United States patents and patent applications, including the present application, are related to each other. Each of the other patents/applications are incorporated by reference herein in its entirety:

U.S. Provisional Patent Application 61/395,654 entitled, METHOD AND SYSTEM FOR EXPLORING OBJECTS IN A DATA DICTIONARY, by Reena Mathew et al., filed on May 13, 2010, and United States Utility Patent Application 13/106,760 entitled METHOD AND SYSTEM FOR EXPLORING OBJECTS IN A DATA DICTIONARY, by Reena Mathew et al., filed May 12, 2011.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to viewing metadata in a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system, information relevant to the request. The rapid and efficient retrieval of accurate information and subsequent delivery of this information to the user system has been and continues to be a goal of administrators of database systems.

Unfortunately, conventional database development tools might be inefficient and/or confuse a database developer if, for example, the tool cannot display information about all entities defined in a data dictionary, the information including basic information, fields, dependencies, metadata, and standard and custom objects, or the tool cannot display dependency information in a visual format that makes it easier for developers to understand the dependencies.

Accordingly, it is desirable to provide techniques that simplify the understanding of dependencies between database entities represented in the data dictionary, and provide dependency information of entities in a data dictionary in a visual format that may improve the ease of understanding the database system.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 6 shows a screenshot of an embodiment of the header section of the unified data dictionary explorer tool;

FIG. 7 shows a screenshot of an embodiment of the unified data dictionary explorer tool with a fields view;

DETAILED DESCRIPTION

General Overview

Systems and methods are provided for exploring objects in a UDD in a multi-tenant database system.

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

As used herein, the term multi-tenant database system refers to a database system that has multiple tenants that each has a degree of access to at least a portion of the database system that may or may not be the same as the degree of access as other tenants. Each tenant may be an individual or an organization that may have representatives, members, employees, customers and/or other entities associated with the tenant, which in turn may also have different degrees of access to the database. The degree of access granted to those associated with the tenant and/or which entities (e.g., representatives, members, employees, customers and/or other entities) are associated with the tenant may be determined by the tenant. The database system may include multiple databases, and each database may be partitioned and/or otherwise shared amongst multiple tenants.

Next, mechanisms and methods for exploring objects in a UDD will be described with reference to example embodiments. In this specification metadata refers to the information about the data in the multi-tenant database system. Metadata describes the characteristics of the data objects such as the type, the name and the size of the data. Metadata may also contain information about the data table as such as the length of fields, the number of columns and other information. Metadata may include the relationship of the data objects. Metadata may help in understanding and interpreting the contents of a database system.

Figure 1:
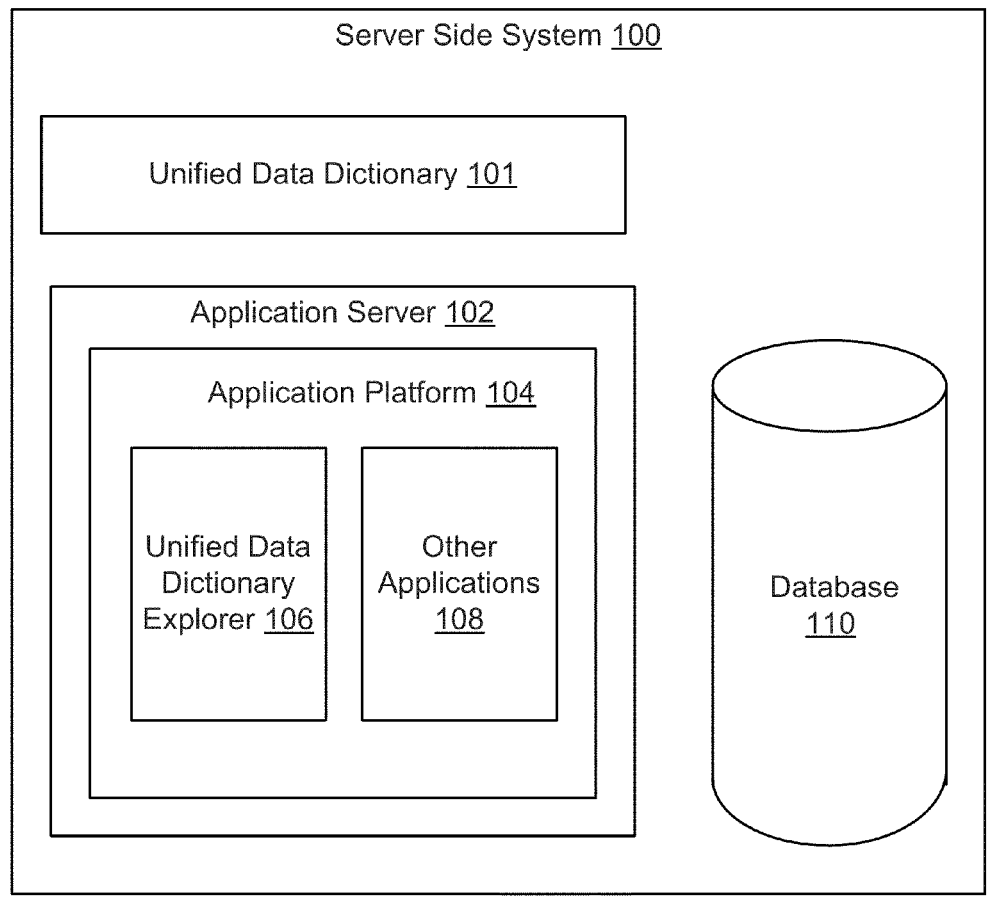
FIG. 1 shows a block diagram of an embodiment of a server system.

FIG. 1 shows an embodiment of a server side system 100 in an on-demand database system. In an embodiment, the server side system may host Unified Data Dictionary (UDD) 101, application server 102, application platform 104, Unified Data Dictionary (UDD) explorer 106, other applications 108 and database 110 among others. In other embodiments server side system 100 may not have all of the elements or features listed and/or may have other elements or features instead of or in addition to those listed.

Server side system 100 may be part of a multi-tenant system. UDD 101 may be the unified data dictionary, e.g., UDD 101 may contain metadata, object and class definitions for creating and defining objects. Multi-tenant applications may be relational-database centric. To abstract away from the database schema in the application server tier, applications need metadata definitions of the physical database schema. In other words, by using the objects available in UDD 101 a developer could write code that performed at least some operations related to a database without having to interact with the database directly (e.g., without necessarily writing SQL statements). The objects in UDD 101 may include objects for retrieving data, generating reports, and/or formatting reports as well as many other operations related to databases. Applications need the ability to use CRUD (create, read, update, delete) operations to view and manipulate database rows. In this specification, the names of objects, pointers, and variables are chosen to describe the function and/or purpose of the object, pointer or variable. The specification is not limited to the specific objects, variables or pointers mentioned, but any combination of objects, variables, or pointers that will accomplish the same or a similar purpose may be substituted for the specific object, pointer or variable mentioned.

UDD 101 may include objects which may form an abstraction away for the database that interprets the physical database schema as well as the CRUD operations to view and manipulate individual database rows. Forms, reports, workflows, user access privileges, tenant-specific customization and business logic, and the underlying data tables and indexes may be defined in UDD 101. UDD 101 provides the properties to define business data, such as accounts and contacts, and metadata, such as packaging. A property may control business data or metadata. In an embodiment, in many case a property does not control both the business data and metadata.

In an embodiment, that multi-tenant database application applications use UDD 101 to automatically associate specific features with specific types of objects. For example, the user interface may rely of UDD 101 for specifying that specific features are present in the user interface, e.g., by calling classes, methods, functions, and/or using other features or properties stored in UDD 101. The look and feel of an individual data row (a row may also be called a record) may be established by UDD 101. UDD 101 may facilitate describing and accessing data in a manner that is useful for the application programming interface (API). UDD 101 may contain features that assist in UDD 101 converting a user request into raw query (e.g., into SQL) that may be run on the database, which may be used a query tool.

Creating a simple database table and corresponding XML definition helps in inspecting the metadata created and performing basic data operations on it. UDD 101 may be associated with UDD hooks that may enable writing custom logic to accommodate specific functionality that UDD 101 may not provide to all entities by default. In this specification hooks refer to codes that intercept function calls, messages, or events that are passed between software components.

UDD 101 may include active and/or passive portions. Metadata definitions and operations may be defined in the passive portion of the Data Dictionary, which may be stored in a file and if written in XML, UDD 101 may be stored in an xml file. The metadata of UDD 101 may include or stored in database tables, that define objects such as Account, Contact, and Case, and custom objects and fields. Each table may have columns, indexes, and constraints that are defined in UDD 101. The classes (e.g., JAVA classes or C classes) representing the metadata may be located in the common.UDD 101 java package or in another location. In an embodiment, the database tables of UDD 101 metadata may be instantiated during application server startup. Passive UDD 101 may be updated manually when there is an update to the metadata of UDD 101.

CRUD operations on individual database rows may be defined in the active UDD 101. CRUD operations may have the lifecycle of a single request to the application server. For example, creating a new account record or updating a user may be data operations. Modifications to the database can change the active UDD 101. The active UDD 101 may map object relations and be or may be included in an object-relationship mapping layer.

Figure 8:
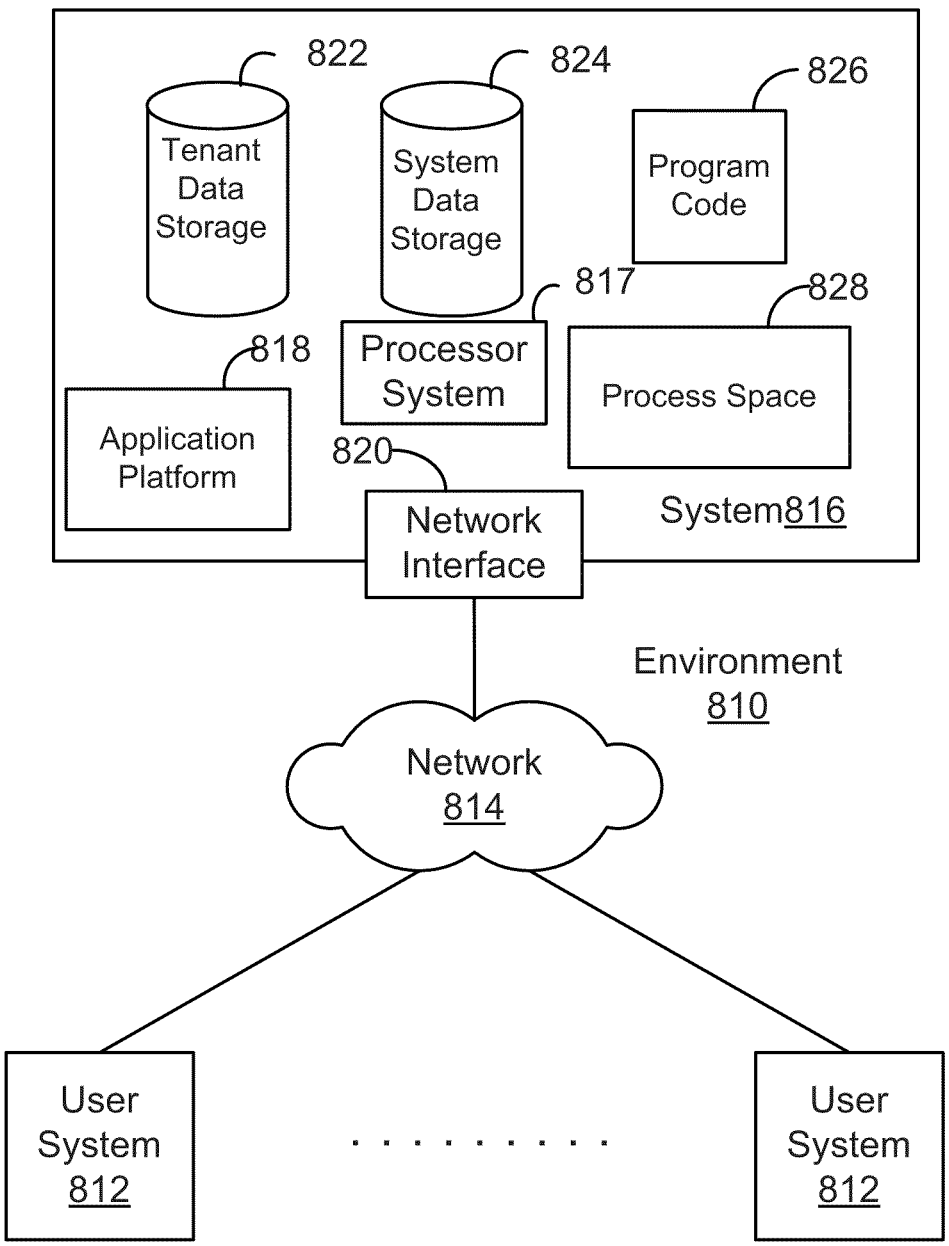
FIG. 8 shows a block diagram of an embodiment of an environment where in an on-demand database service might be used for methods and systems for exploring objects in a data dictionary.

In an embodiment in a multi-tenant database system, application server 102 sends data and other messages (e.g., output from API routines called by the user system) to user systems, retrieves data and other information for users, receives messages (e.g., the results of interacting with data and/or functions calls to API functions from users (user system is described further in conjunction with FIG. 8). Application platform 104 is the platform that hosts UDD explorer and other applications.

UDD explorer 106 may be a tool that allows the user to explore UDD 101. In other words, UDD explorer 106 may be a tool for retrieving, navigating, and viewing pages (e.g., webpages) that provide information about individual UDD entities and the relationships of the UDD entities with other entities (which may also be UDD entities. In an embodiment, UDD explorer 106 may be used by internal database developers to understand dependencies between multitenant application entities that are represented in UDD 101. UDD explorer 106 shows dependencies between metadata (for example: Custom Object & Tab) and data entities (for example, a database table for accounts & contacts), which may be generic to all organizations of the multitenant database, and may show organization-specific dependencies between metadata and data entities depending on the organizations permanent/preferred settings. The dependency information of entities enable database developers to efficiently explore objects in UDD 101 and better understand the dependencies of entities in the database. In an embodiment, the tool may be used by customers for showing organization specific information in a visual format. UDD explorer 106 may be used by developers, a quality assurance team, and project managers, and may be used in documentation related to a system having a UDD.

UDD explorer 106 may show information about entities defined in UDD 101 irrespective of an organization type such as basic information, fields, dependencies, entities that refer to an entity and entities that an entity may refer to.

UDD explorer 106 may use UDD 101.EntityCommon methods to get the information about the entities. UDD 101.EntityCommon may be a collection of application that defines the standard objects used by the multi-tenant database users. UDD explorer 106 may also show information about all entities defined for a specific organization such as standard and custom objects and metadata dependencies. Entities may be searched using KeyPrefix, Entity Label and Entity Name.

UDD explorer 106 uses information gathering method of UDD 101 and/or other methods for to getting information about entities. The information gathering methods UDD 101 may include data definitions for modified standard objects and custom objects specific to each organization. UDD explorer 106 may also show all the dependency information in a visual format that makes it easier for users to understand.

UDD explorer 106 supports UDD 101 information layer and UDD 101 common layers. UDD 101 common layer may provide information on organization-independent metadata and may not contain any information on custom fields, objects, or relationships. The common layers define standard entities that are used by all users of UDD 101 and in an embodiment are the core of UDD 101. The common layer may be available in non-production environments and provides information about entities defined in UDD 101 irrespective of the type of organization. The common layer may be accessed from a link from a tab having a set of tools used to monitor the custom objects and fields created by the tenants of the multi-tenant database system and to monitor the relationships between object (such as the relationships between objects and fields). UDD 101 information layer provides information on organization-specific metadata including custom fields, objects and relationships and may be available in all with access to the black tab. The information layer may be used to make modifications to permissions and fields on the common layer so customize the entities for specific users and organizations.

Other applications 108 may include applications required to perform database operations and one or more instructions that cause a processor to render a webpage. Rendering the webpage may involve performing computations, such as retrieving information, which may be in response to the user input.

Database 110 may be a multi-tenant relational database having different portions dedicated to different tenants. As a result of implementing application platform 104, application server 102 may access database 110 to store information received from the user system or may receive a messages that triggers a query for information stored in database 110. Database 110 may include a database server and a database. Application server 102, as a result of a message form a user triggering a query, may also retrieve information from database 110 requested by the tenant. Users, such as developers, may access database 110, via applications server 102 in order to test and/or add/modify features to database 110.

System of Exploring Objects in a Unified Data Dictionary

Figure 2:
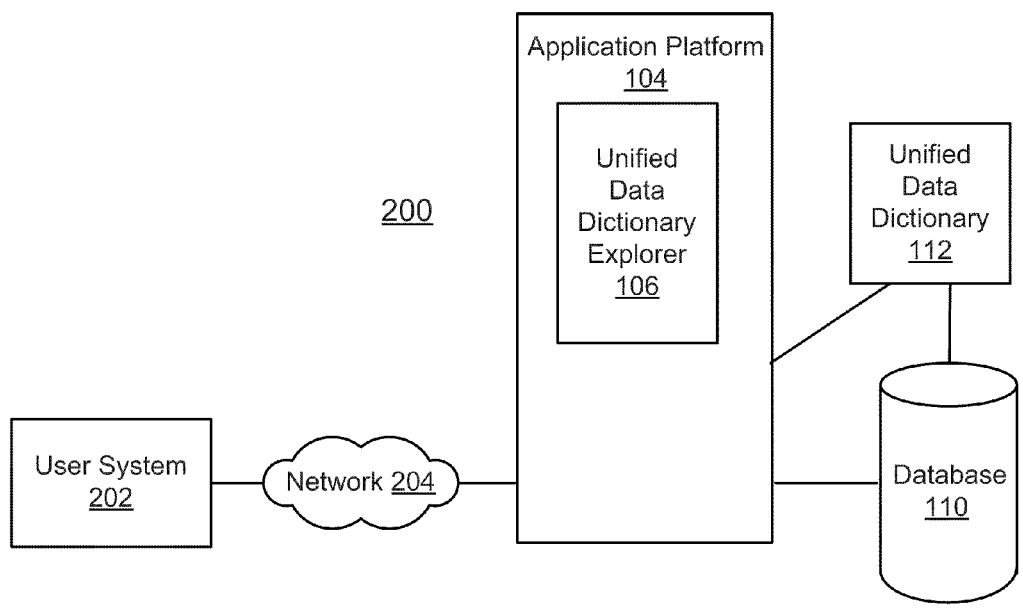
FIG. 2 shows a block diagram of an embodiment of a system of exploring objects in a unified data dictionary (UDD) in a multi-tenant database system.

FIG. 2 shows an embodiment of a system 200 for exploring objects in a unified data dictionary of a multi-tenant database system. In an embodiment, system 200 may have UDD 101, application server 102, UDD explorer 106, database 110, user system 202, and network 204. In other embodiments the system may not have all of the elements or features listed and/or may have other elements or features instead of or in addition to those listed.

UDD 101, application server 102, UDD explorer 106, database 110 were discussed above in FIG. 1. In an embodiment, user system 202 (which will be discussed further in conjunction with FIG. 8) may be any machine or system that may be used by a user to access a network or a server system (discussed further in conjunction with FIG. 8). Network 204 (further discussed in conjunction with FIG. 8) may be any network or combination of networks of devices that communicate with one another. Depending on the access level granted, user system 202 may interact, via network 204, with UDD explorer 106, database 110 and UDD 101. User system 202 may interact, via application server 102, with UDD explorer 106 to view information about UDD 101 or, depending on the access level granted to user system 202, may interact with UDD 101 of database 110, without interacting with UDD explorer 106.

Client Side Method of Exploring Objects in a UDD

Figure 3:
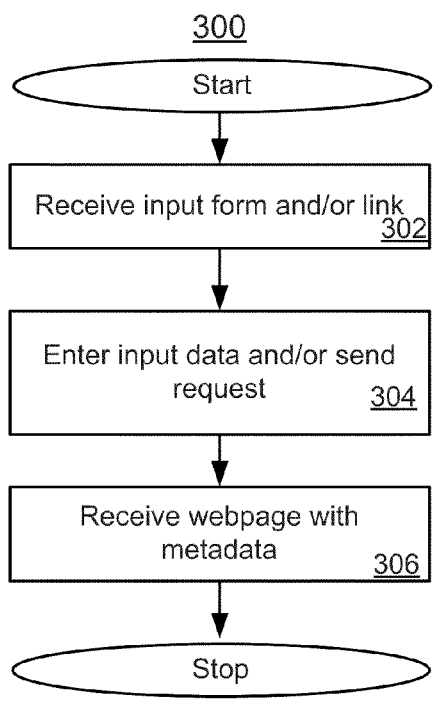
FIG. 3 shows a flowchart of an embodiment of a user system of exploring objects in a UDD in a multi-tenant database system.

FIG. 3 shows a flowchart of an embodiment of a client-side method 300 for exploring objects in a unified data dictionary. In step 302, the user system (which will be discussed in conjunction with FIG. 8) may receive a page with an input form or link to provide a visual format for representing dependency information of entities. The page may include fields for entering an identifier of a tenant or other organization associated with the entity, an identifier of a layer, and/or field for entering a search sting or name of an entity that may be used for finding a particular entity that the user wishes to view. The page may also include various filters to aid in finding entities that the user may not know the name of. In step 304, the user system may input data through the user interface of UDD explorer 106 requesting to explore a UDD entity. The data entered may include selections of the organization, identifier, a layer, a search string, and/or filter settings. The request may be to inspect individual UDD entities or the relationship between different entities. In step 306, in response to the request, the user system receives the requested entity or entity relationship information in the unified data dictionary explorer 106.

In an embodiment, the user system may receive a unified data dictionary explorer tool along with the entity or entity relationship information in a graphical format having color-coded nodes. In an embodiment, each node or relationship entity may be loaded on the fly and asynchronously, where unloaded nodes are indicated with a special designation, which may be replaced with the number of child relationships once the nodes are loaded. While the present invention may be described with reference to an embodiment in which techniques for exploring objects in UDD 101 are implemented in a system having an application server providing a front end for an on-demand database service capable of supporting multiple tenants, the present invention is not limited to multi-tenant databases or deployment on application servers. Embodiments may be practiced using other database architectures, i.e., ORACLE®, DB2® by IBM and the like without departing from the scope of the embodiments claimed.

In an embodiment, each of the steps of method 300 may be a distinct step. In other embodiments, method 300 may not have all of the above steps and/or may have other steps in addition to or instead of those listed above. The steps of method 300 may be performed in another order. Subsets of the steps listed above as part of method 300 may be used to form their own method. In an embodiment, there could be multiple instances of method 300.

Server Side Method of Exploring Objects in UDD 101

Figure 4:
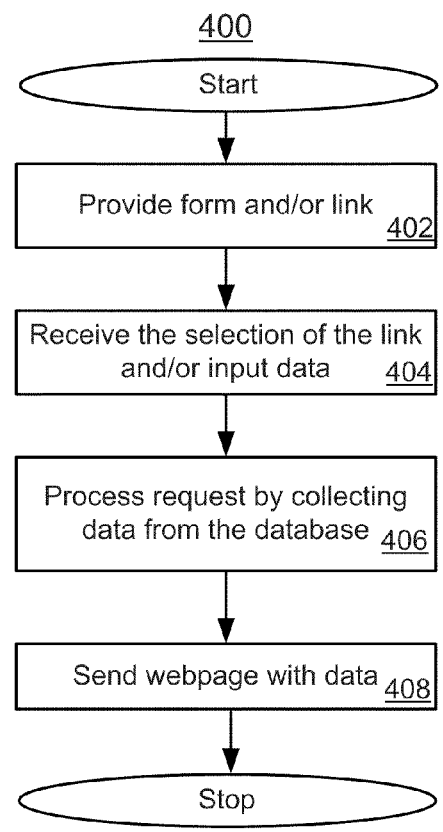
FIG. 4 shows a flowchart of an embodiment of a server system of exploring objects in a UDD in a multi-tenant database system.

FIG. 4 shows a flowchart of an embodiment of a server-side method 400 for exploring objects in a UDD 101 by a user system.

In step 402, the server system (discussed in conjunction with FIG. 8) may provide a page (e.g. a webpage or other page) with an input form or link to explore objects in a UDD 101 and better understand the dependencies of entities in the database. In step 404, the server system receives the selection of the link and the input data. The input data may be the entity that needs to be explored. In step 406, the server system processes the request by collecting the data from the database. Step 406 may include the application server 102 sending a request to the database to fetch the requested data. In step 408, the server system presents the page with requested data.

In an embodiment, each of the steps of method 400 may be a distinct step. In other embodiments, method 400 may not have all of the above steps and/or may have other steps in addition to or instead of those listed above. The steps of method 400 may be performed in another order. Subsets of the steps listed above as part of method 400 may be used to form their own method. In an embodiment, there could be multiple instances of method 400.

Screenshots

Figure 5A:
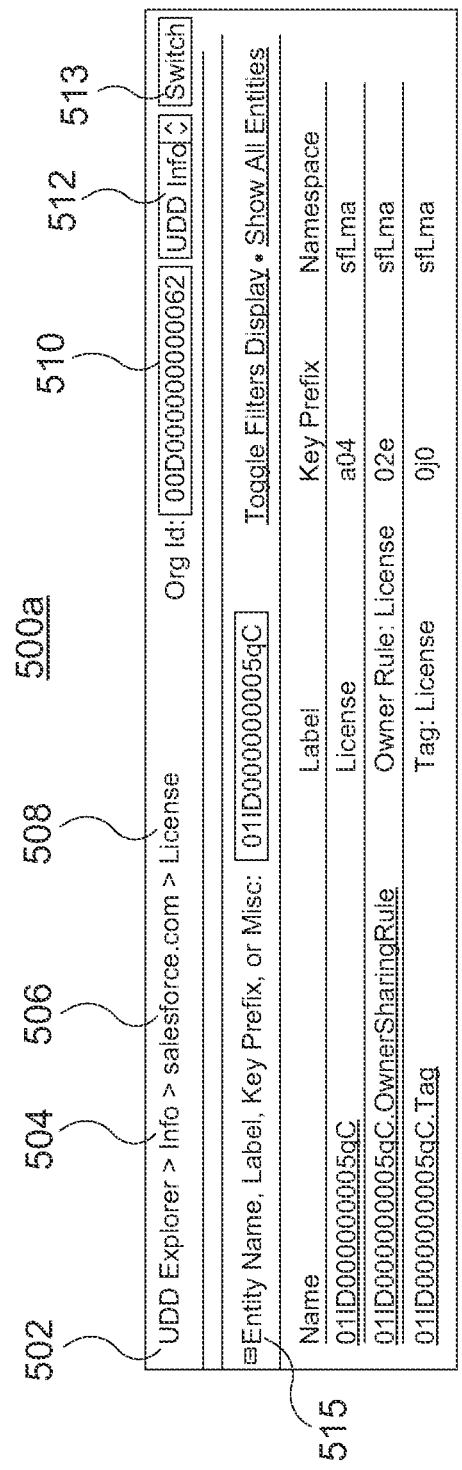
FIG. 5*a* shows a screenshot of an embodiment of the unified data dictionary explorer tool with a graphical view.

FIG. 5a shows a screenshot of an embodiment of a portion of a page of user interface 500a of an embodiment of the unified data dictionary explorer tool showing an example of a requested entity with a graphical view. User interface 500a has header 502, layer 504, organization 506, entity 508, org-id 510, mode 512, switch 513, and entity search 515. In other embodiments, user interface 500a may not have all of the elements listed and/or may have other elements instead of or in addition to those listed.

User interface 500a may provide a tree view, which is a graphical view, showing the dependencies to or from the currently selected entity object. The tree view may provide the same information and/or similar information as is usually provided in an Entity Relationship Diagram. The tree view may be used to show all dependencies for a specific entity, such as the ApexPage. For example, for the ApexPage, the tree view displays all entities that may refer to Apex Page and all entities that an Apex Page may refer to (which may include a Created By object). In an embodiment, optionally, the tree view also shows all fields of the entities, which facilitates documentation personnel documenting information about the entity, so that the tree view may be used by documentation personnel as a basis for making ERDs. In an embodiment, different visibility modes may support many tree requests. The tree view may include other functions, such as a search tool for entities that match a certain criteria. For example, a filter may be provided, or a search tool may be provided that allows a user to enter a search for all entities that are workflow enabled. The views of FIGS. 5-7 are part of the tree view.

User interface 500a has header 502 which displays the name UDD explorer, layer type, name of the viewing organization, entity, organization identification number and the mode. Layer 504 displays the layer of the UDD, such as common layer or information layer, currently being viewed. In the screen shot of FIG. 5a, user interface 500a shows information layer referred to as 'info'. Organization 506 lists the organization of the UDD entity currently being viewed. Entity 508 shows the UDD entity being viewed. In user interface 500a, the UDD entity is license. Org-id 510 is an input field for organization identification number of the organization associated with the UDD entity being viewed. Mode 512 is a drop down menu used to select the UDD layer of the UDD entity being viewed. User interface 500a shows information about the UDD entity being viewed, which may include other information about the UDD layer being viewed. Switch 513 is a switch button used to switch the organization and/or layer being viewed. If the current organization is not the one listed in Org_id 510, then selecting the switch button changes the organization in the UDD explorer to the organization referred to in org_id 510. In an embodiment, organizations may be switched only if the organization number in the field of org_id 510 is valid and an organization with that Id exists. In an embodiment, org_id 510 may turn green once a valid organization identification number is provided or red if an invalid organization number is entered or another indicator may be used to indicate that the organization id is incorrect. Entity search 515 may be a collapsible dynamic entity search, which may include an auto-complete feature for supplementing a search in progress using names that may be associated with a search, label, key prefix, package namespace (Data Dictionary Info), or comment (Data Dictionary Common) that the user is searching for and presenting the completed information to the user as a search suggestion.

Figure 5B:
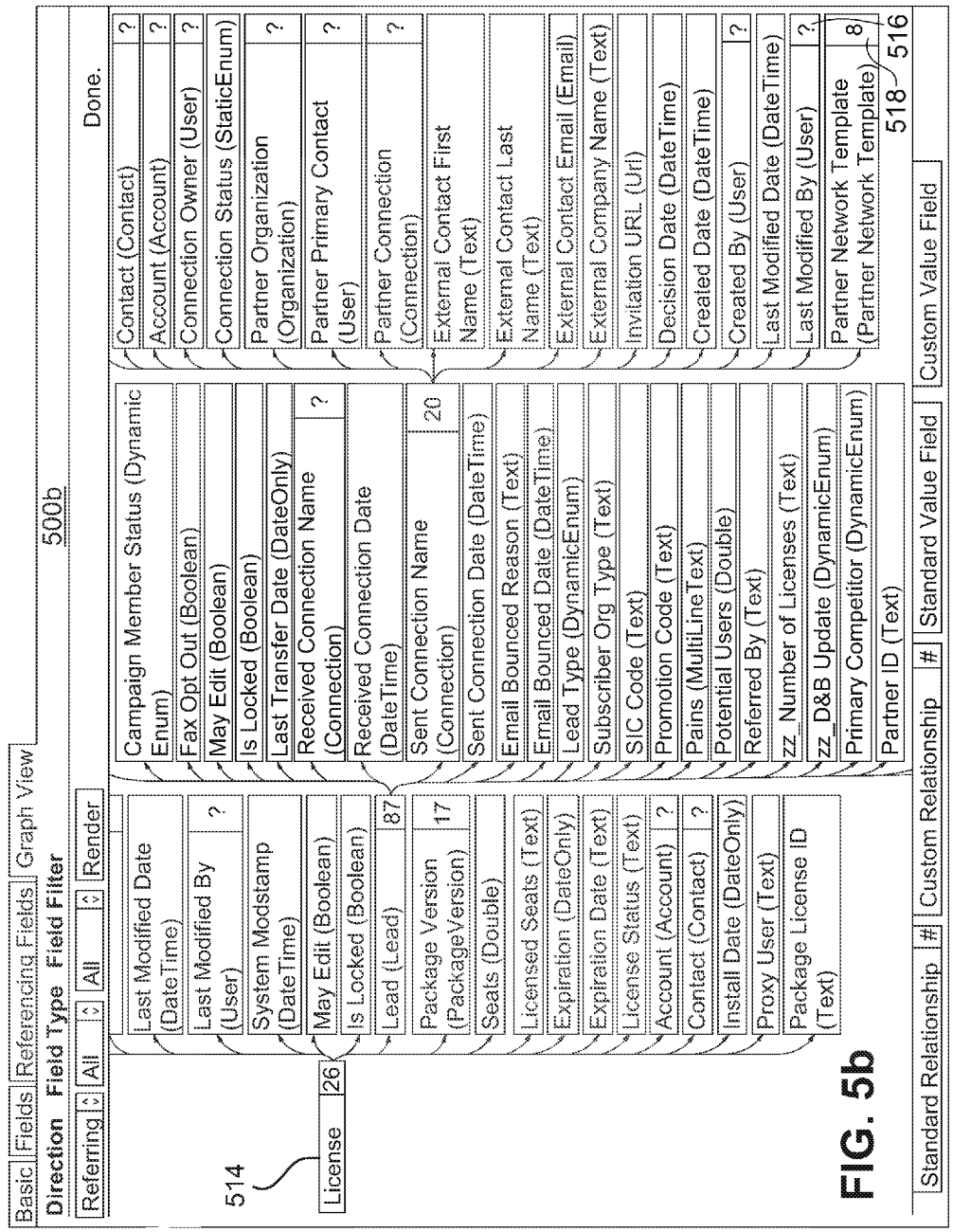
FIG. 5*b* shows a screenshot of an embodiment of the unified data dictionary explorer tool with a graphical view.

FIG. 5b shows a screenshot of an embodiment of a portion of a page of user interface 500b of an embodiment of the unified data dictionary explorer tool showing an example of a requested entity with a graphical view. User interface 500b has graphical view 514, unloaded node 516 and loaded node 518. In other embodiments, user interface 500b may not have all of the elements listed and/or may have other elements instead of or in addition to those listed.

Graphical view 514 shows the graphical view of the UDD entity and relationship of the UDD entity selected to other UDD entities. Graphical view 514 may provide a customizable interactive graphical view of the relationships of an entity with color coded nodes, with each color indicating a different type of an object. As alluded to above, each node or relationship entity may be loaded on the fly, asynchronously. By loading the nodes on the fly, the information presented in UDD explorer 106 is as update as UDD 101. The graphical view has a pull down menu for selecting the direction of relationship between objects or other entities, type of field and filter. The direction of relationship may be whether nodes are, inheriting from, inherited by, depend on, are depended upon, or otherwise referred to or referred by the entity object represented by other nodes. The type of field to display in the graphical view refers to the standard fields, custom fields or all fields. By selecting standard, the only filed displayed are the standard relationships. By selecting custom, the only relationships that are displayed are the custom relationships. The custom relationships are those that are unique to a particular tenant, and the standard relationships are those that are provided to all tenants and/or do not involve any specific tenant. The filter field may be the additional filter of the types of information to display such as value, relationships or all.

Unloaded node 516 may be a node or relationship that is not loaded. Unloaded nodes may be denoted by a symbol and later replaced with the number of child relationships by selecting the node. In an embodiment, the symbol representing an unloaded node may be a question mark ("?"). Loaded node 518 may be a node indicating the number of child relationships. In the screenshot loaded node 518 is loaded with 8 nodes.

FIG. 6 may be a screenshot of header 600 of an embodiment of the header section of the graphical user interface of UDD explorer 106. Header 600 has entity label 602, entity 604, filter 606, toggle 608, filter button 610 and entities 612. In other embodiments, header 600 may not have all of the elements listed and/or may have other elements instead of or in addition to those listed.

Header 600 is a different view of the header of FIG. 5, and may include a collapsible dynamic entity search, Boolean search, auto-complete features, and filters which are displayed in the user interface of UDD explorer 106. Entity label 602 may be a collapsible header. Entity 604 may be an input field showing the name of the entity. Entering text in entity label 604 will initiate an auto-complete feature with the search field which searches fields of the current entity dictionary concurrently on the fields: name, label, and key prefix, package namespace in case of information layer, or comment in case of common layer. Matched results may be displayed, sorted alphabetically by name below the field so that user may select one of the results rather than finishing the typing of the entry.

Filters 606 are generated for each Boolean property of an entity through Java reflection. The user interface may provide the ability to filter the information provided based on the values of up to 4 boolean properties that may be selected using the drop down pick lists in the filters panel. A value of none may be selected for any unused filters. Toggle 608 when selected may show or hide filters. Filter button 610 when selected may filter and update the auto-complete dictionary, so that auto complete shows matches on the filtered results. Entities 612 when selected bypass the auto-complete and list all entities in the auto dictionary, which may be useful for displaying results on filters.

FIG. 7 may be a screenshot of entity 700 of an embodiment of a page of the user interface of UDD explorer 106. Entity 700 has entity tab 702, fields 703a, referencing 703b, graphical view 703c, name 704, label 706, type 708, permission 710, custom 712, calculated 714, and id 716. In other embodiments, header 700 may not have all of the elements listed and/or may have other elements instead of or in addition to those listed.

Entity 700 depicts the entity fields tab having information about all fields of an entity including name, label, id, and permissions. Entity 700 has entity tab 702 selected displaying basic information about the entity and the properties associated with the entity. Fields 703a is the tab currently selected, which displays information about the fields of the entity, which may include a list of fields and the properties of the fields. Referencing 703b is a tab, which once selected, brings the user to a page displaying general information about all fields, and the entities that have that field and that refer to the current entity. Graphical view 703c when selected displays a customizable interactive graphical view of the relationships of an Entity with color coded nodes, a screenshot similar to, or such as screenshot 500. Name 704 lists the name of the fields of the current entity. Label 706 lists the label associated with the fields of the entity, which are displayed to the user, so the user knows what the field is for. Type 708 lists the type of the field of the entity object. Each type may have certain properties associated with that type, such as whether the field will accept any text or just numerical input and/or the number of characters in the field. Permission 710 shows the permission associated with an entity, such as whether the field is readable by the user and/or editable by the user. Custom 712 is a column that indicates whether each filed is a custom field provided on a tenant by tenant basis or whether the field is standard. Calculated 714 is a column that indicates weather the field contains a value that is calculated. If the field is not calculated, the filed may be an input field or another form of output. Id 716 is column that indicates the id of each field.

System Overview

FIG. 8 illustrates a block diagram of an environment 810 wherein an on-demand database service might be used. Environment 810 may include user systems 812, network 814, system 816, processor system 817, application platform 818, network interface 820, tenant data storage 822, system data storage 824, program code 826, and process space 828. In other embodiments, environment 810 may not have all of the components listed and/or may have other elements instead of, or in addition to, those listed above.

Environment 810 is an environment in which an on-demand database service exists. User system 812 may be any machine or system that is used by a user to access a database user system. For example, any of user systems 812 may be a handheld computing device, a mobile phone, a laptop computer, a work station, and/or a network of computing devices. As illustrated in FIG. 8 (and in more detail in FIG. 9) user systems 812 might interact via a network 814 with an on-demand database service, which is system 816.

An on-demand database service, such as system 816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 816" and "system 816" will be used interchangeably herein. A database image may include one or more database objects. A relational database management system (RDMS) or the equivalent may execute storage and retrieval of information against the database object(s). Application platform 818 may be a framework that allows the applications of system 816 to run, such as the hardware and/or software, e.g., the operating system. In an embodiment, on-demand database service 816 may include an application platform 818 that enables creation, managing and executing one or more applications developed by the provider of the on-demand database service, users accessing the on-demand database service via user systems 812, or third party application developers accessing the on-demand database service via user systems 812.

The users of user systems 812 may differ in their respective capacities, and the capacity of a particular user system 812 might be entirely determined by permissions (permission levels) for the current user. For example, where a salesperson is using a particular user system 812 to interact with system 816, that user system has the capacities allotted to that salesperson. However, while an administrator is using that user system to interact with system 816, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 814 is any network or combination of networks of devices that communicate with one another. For example, network 814 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 812 might communicate with system 816 using TCP/IP and, at a higher network level, use other common Internet protocols to communicate, such as HTTP, FTP, AFS, WAP, etc. In an example where HTTP is used, user system 812 might include an HTTP client commonly referred to as a "browser" for sending and receiving HTTP messages to and from an HTTP server at system 816. Such an HTTP server might be implemented as the sole network interface between system 816 and network 814, but other techniques might be used as well or instead. In some implementations, the interface between system 816 and network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 816, shown in FIG. 8, implements a web-based customer relationship management (CRM) system. For example, in one embodiment, system 816 includes application servers configured to implement and execute CRM software applications as well as provide related data, code, forms, webpages and other information to and from user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 816 implements applications other than, or in addition to, a CRM application. For example, system 816 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 816.

One arrangement for elements of system 816 is shown in FIG. 8, including a network interface 820, application platform 818, tenant data storage 822 for tenant data 923, system data storage 824 for system data 925 accessible to system 816 and possibly multiple tenants, program code 826 for implementing various functions of system 816, and a process space 828 for executing MTS system processes and tenant-specific processes, such as running applications as part of an application hosting service. Additional processes that may execute on system 816 include database indexing processes.

Several elements in the system shown in FIG. 8 include conventional, well-known elements that are explained only briefly here. For example, each user system 812 could include a desktop personal computer, workstation, laptop, PDA, cell phone, or any wireless access protocol (WAP) enabled device or any other computing device capable of interfacing directly or indirectly to the Internet or other network connection. User system 812 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 812 to access, process and view information, pages and applications available to it from system 816 over network 814. Each user system 812 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 816 or other systems or servers. For example, the user interface device may be used to access data and applications hosted by system 816, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each user system 812 and all of its components are operator configurable using applications, such as a browser, including computer code run using a central processing unit such as an Intel Pentium® processor or the like. Similarly, system 816 (and additional instances of an MTS, where more than one is present) and all of their components might be operator configurable using application(s) including computer code to run using a central processing unit such as processor system 817, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring system 816 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 816 is configured to provide webpages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 9:
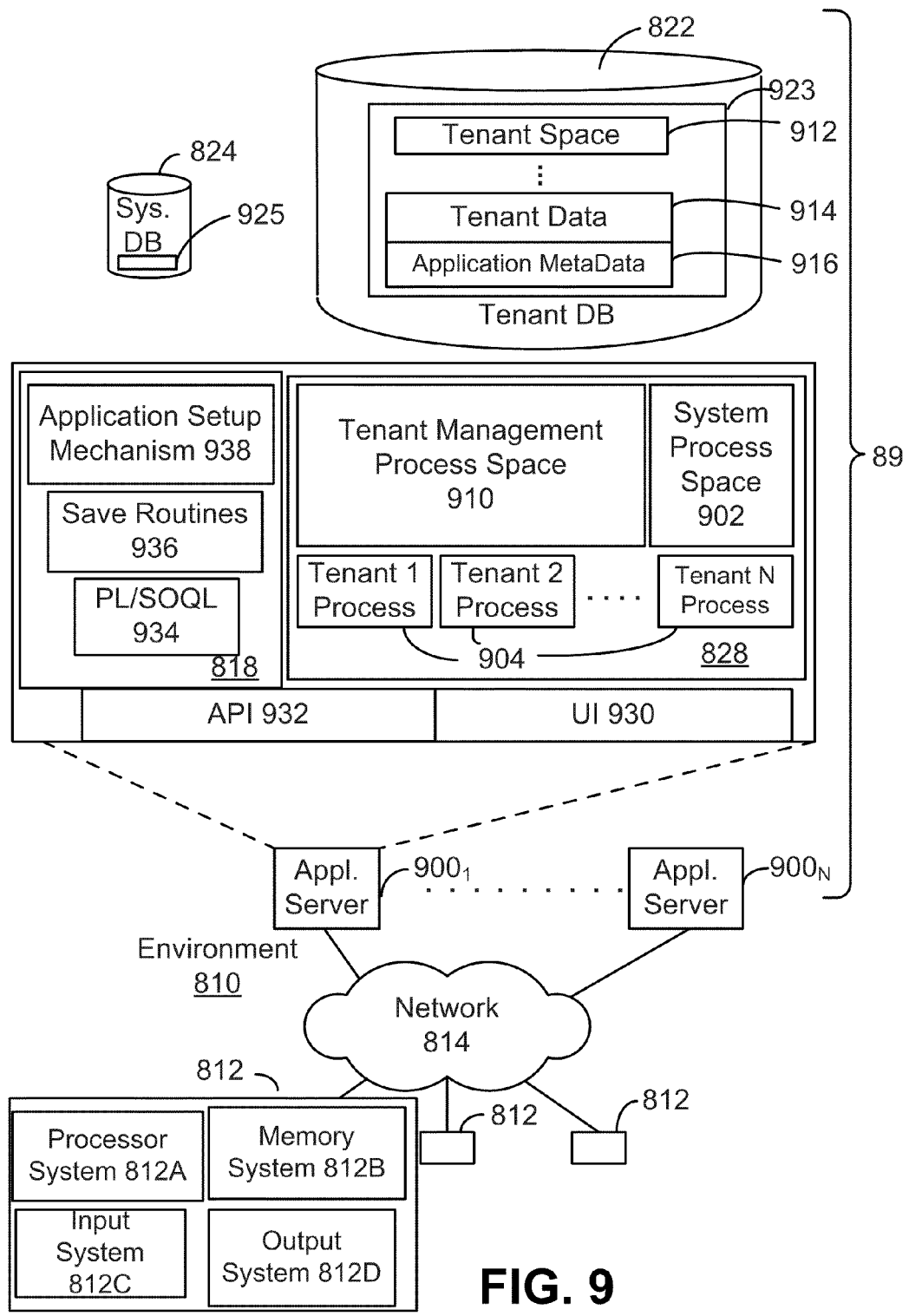
FIG. 9 shows a block diagram of an embodiment of elements of FIG. 8 and various possible interconnections between elements in an embodiment for methods and systems for exploring objects in a data dictionary.

FIG. 9 also illustrates environment 810. However, in FIG. 9 elements of system 816 and various interconnections in an embodiment are further illustrated. FIG. 9 shows that user system 812 may include processor system 812A, memory system 812B, input system 812C, and output system 812D. FIG. 8 shows network 814 and system 816. FIG. 9 also shows that system 816 may include tenant data storage 822, tenant data 923, system data storage 824, system data 925, User Interface (UI) 930, Application Program Interface (API) 932, PL/SOQL 934, save routines 936, application setup mechanism 938, applications servers 9001-2700N, system process space 802, tenant process spaces 804, tenant management process space 810, tenant storage area 812, user storage 814, and application metadata 816. In other embodiments, environment 810 may not have the same elements as those listed above and/or may have other elements instead of, or in addition to, those listed above.

User system 812, network 814, system 816, tenant data storage 822, and system data storage 824 were discussed above in FIG. 8. Regarding user system 812, processor system 812A may be any combination of one or more processors. Memory system 812B may be any combination of one or more memory devices, short term, and/or long term memory. Input system 812C may be any combination of input devices, such as one or more keyboards, mice, trackballs, scanners, cameras, and/or interfaces to networks. Output system 812D may be any combination of output devices, such as one or more monitors, printers, and/or interfaces to networks. As shown by FIG. 8, system 816 may include a network interface 820 (of FIG. 8) implemented as a set of HTTP application servers 900, an application platform 818, tenant data storage 822, and system data storage 824. Also shown is system process space 802, including individual tenant process spaces 804 and a tenant management process space 810. Each application server 900 may be configured to tenant data storage 822 and the tenant data 923 therein, and system data storage 824 and the system data 925 therein to serve requests of user systems 812. The tenant data 923 might be divided into individual tenant storage areas 812, which may be either a physical arrangement and/or a logical arrangement of data. Within each tenant storage area 812, user storage 814 and application metadata 816 might be similarly allocated for each user. For example, a copy of a user's most recently used (MRU) items might be stored to user storage 814. Similarly, a copy of MRU items for an entire organization that is a tenant might be stored to tenant storage area 812. A UI 930 provides a user interface and an API 932 provides an application programmer interface to system 816 resident processes to users and/or developers at user systems 812. The tenant data and the system data may be stored in various databases, such as one or more Oracle™ databases.

Application platform 818 includes an application setup mechanism 938 that supports application developers' creation and management of applications, which may be saved as metadata into tenant data storage 822 by save routines 936 for execution by subscribers as one or more tenant process spaces 804 managed by tenant management process 810 for example. Invocations to such applications may be coded using PL/SOQL 934 that provides a programming language style interface extension to API 932. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manage retrieving application metadata 816 for the subscriber making the invocation and executing the metadata as an application in a virtual machine.

Each application server 900 may be communicably coupled to database systems, e.g., having access to system data 925 and tenant data 923, via a different network connection. For example, one application server 9001 might be coupled via the network 814 (e.g., the Internet), another application server 900N-1 might be coupled via a direct network link, and another application server 900N might be coupled by yet a different network connection. Transfer Control Protocol and Internet Protocol (TCP/IP) are typical protocols for communicating between application servers 900 and the database system. However, it will be apparent to one skilled in the art that other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 Big-IP load balancer) is communicably coupled between the application servers 900 and the user systems 812 to distribute requests to the application servers 900. In one embodiment, the load balancer uses a least connections algorithm to route user requests to the application servers 900. Other examples of load balancing algorithms, such as round robin and observed response time, also may be used. For example, in certain embodiments, three consecutive requests from the same user could hit three different application servers 900, and three requests from different users could hit the same application server 900. In this manner, system 816 is multi-tenant, wherein system 816 handles storage of, and access to, different objects, data and applications across disparate users and organizations.

As an example of storage, one tenant might be a company that employs a sales force where each salesperson uses system 816 to manage their sales process. Thus, a user might maintain contact data, leads data, customer follow-up data, performance data, goals and progress data, etc., all applicable to that user's personal sales process (e.g., in tenant data storage 822). In an example of a MTS arrangement, since all of the data and the applications to access, view, modify, report, transmit, calculate, etc., may be maintained and accessed by a user system having nothing more than network access, the user may manage his or her sales efforts and cycles from any of many different user systems. For example, if a salesperson is visiting a customer and the customer has Internet access in their lobby, the salesperson may obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 816 might also maintain system level data usable by multiple tenants or other data. Such system level data might include industry reports, news, postings, and the like that are sharable among tenants.

In certain embodiments, user systems 812 (which may be client systems) communicate with application servers 900 to request and update system-level and tenant-level data from system 816 that may require sending one or more queries to tenant data storage 822 and/or system data storage 824. System 816 (e.g., an application server 900 in system 816) automatically generates one or more SQL statements (e.g., one or more SQL queries) that are designed to access the desired information. System data storage 824 may generate query plans to access the requested data from the database.

Each database may generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/8128, 161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Method for Using the Environment (FIGS. 8 and 9)

Figure 10:
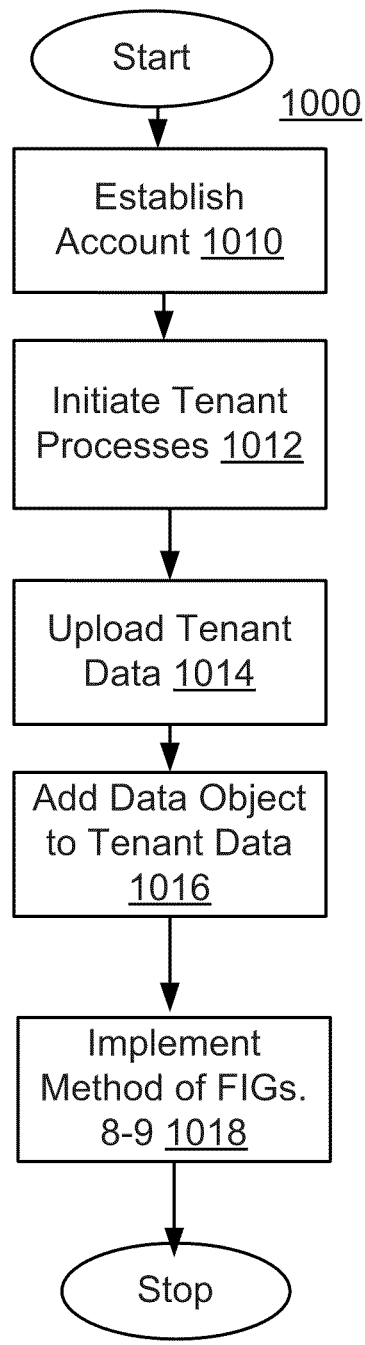
FIG. 10 illustrates an embodiment of an environment within which the system for exploring objects in a data dictionary may operate.

FIG. 10 shows a flowchart of an example of a method 1000 of using environment 810. In step 1010, user system 812 (FIGS. 8 and 9) establishes an account. In step 1012, one or more tenant process space 904 (FIG. 9) are initiated on behalf of user system 812, which may also involve setting aside space in tenant space 912 (FIG. 9) and tenant data 914 (FIG. 9) for user system 812. Step 1012 may also involve modifying application metadata to accommodate user system 812. In step 1014, user system 812 uploads data. In step 1016, one or more data objects are added to tenant data 914 where the data uploaded is stored. In step 1018, the methods associated with FIGS. 8-9 may be implemented. In another embodiment, although depicted as distinct steps in FIG. 10, steps 1002-1018 may not be distinct steps. In other embodiments, method 1000 may not have all of the above steps and/or may have other steps in addition to, or instead of, those listed above. The steps of method 1000 may be performed in another order. Subsets of the steps listed above as part of method 1000 may be used to form their own method.

Method for Creating the Environment (FIGS. 8 and 9)

Figure 11:
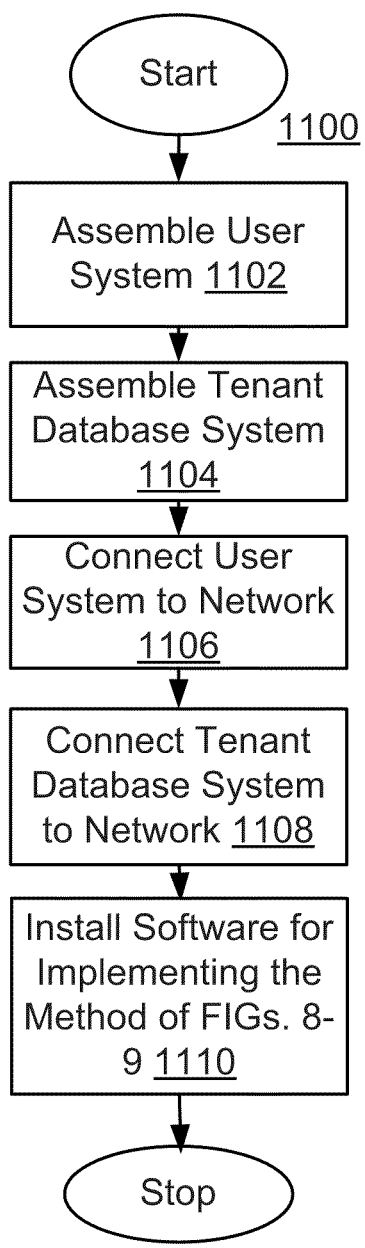
FIG. 11 illustrates an embodiment of elements of FIG. 10 and various possible interconnections between elements of the environment.

FIG. 11 is a method of making environment 810, in step 1102, user system 812 (FIGS. 8 and 9) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 1104, system 816 (FIGS. 8 and 9) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 816 may include installing application platform 818, network interface 820, tenant data storage 822, system data storage 824, system data 925, program code 826, process space 828, UI 930, API 932, PL/SOQL 934, save routine 936, application setup mechanism 938, applications servers 900₁-900ₙ, system process space 102, tenant process spaces 904, tenant management process space 910, tenant space 912, tenant data 914, and application metadata 916 (FIG. 9).

In step 1106, user system 812 is communicatively coupled to network 904. In step 1108, system 816 is communicatively coupled to network 904 allowing user system 812 and system 816 to communicate with one another (FIG. 9). In step 1110, one or more instructions may be installed in system 816 (e.g., the instructions may be installed on one or more machine readable media, such as computer readable media, therein) and/or system 816 is otherwise configured for performing the steps of methods associated with FIGS. 8-9. In an embodiment, each of the steps of method 1100 is a distinct step. In another embodiment, although depicted as distinct steps in FIG. 11, steps 1102-1110 may not be distinct steps. In other embodiments, method 1100 may not have all of the above steps and/or may have other steps in addition to, or instead of, those listed above. The steps of method 1100 may be performed in another order. Subsets of the steps listed above as part of method 1100 may be used to form their own method.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A method for exploring a data dictionary of a database, comprising:
    sending from a host system, a page with a user interface having an input area that receives input data related to an identity of an entity object, the entity object being one of a collection of objects that perform database related activities, the entity objects in the collection facilitate writing code for performing the database related activities without having to interact with the database directly, the host system including one or more machines including a processor system having at least one or more processors and a memory system that stores the database, and metadata associated with the entity object;
    receiving, by the host system, the page with a selection of the entity object;
    retrieving, by the processor system, metadata of a set of one or more entity objects from the collection based on the input data related to the identity; and
    sending, from the host system, a data description of at least one of the entity object associated with the entity object selected including at least the metadata of the entity object.
2. The method of claim 1, wherein the page with the user interface is customizable, having a header section that is collapsible, the header section including a pull down menu for entering a layer in which the entity object is available.
3. The method of claim 1, wherein the page with the user interface is interactive, and includes a field for entering an organization identifier that the entity object is associated with.
4. The method of claim 1, wherein the sending of the data description includes sending information that causes nodes to have a visual coding, such that nodes of standard entity objects that are provided to all tenants have a first type of visual appearance, and nodes of custom entity objects that are created for a specific tenant have a second type of visual appearance.
5. The method of claim 1, wherein the sending of the data description includes sending information that causes nodes to have a color coding, such that nodes of standard entity objects that are provided to all tenants are colored with first color, and nodes of custom entity objects that are created for a specific tenant colored with a second color.
6. The method of claim 1, the sending of the data description includes sending a value representing how many child nodes are dependent on a given node, and sending information causing the value to be displayed next to the given node.
7. The method of claim 1, the retrieving of the metadata includes retrieving data that is updated in real time.
8. The method of claim 1, further comprising sending information that causes a question mark to be displayed, instead of a value representing how many nodes, next to a node in a graph for which metadata was not retrieved that is adequate for determining how many nodes depend from the object entity represented by the node in the graph.
9. The method of claim 1, further comprising presenting to a user a choice of direction of relationships of nodes for the user to choose.
10. The method of claim 1, the metadata includes dependencies of the entity object and a direction of the dependencies.
11. The method of claim 10, wherein the dependencies of at least the entity object and the direction of the dependencies include dependencies of objects that are specific to a particular tenant of the multitenant database.
12. The method of claim 1, the data description sent includes a graphical format with the entity object as a node and dependent objects as child nodes.
13. The method of claim 12,
    wherein the metadata includes at least a representation of a standard entity object that is provided to multiple tenants, and a representation of a custom entity object that is specific to a tenant;
    wherein the page with the user interface is customizable having a tool to change a direction of the dependencies displayed, includes a field for entering an organization identification number and page displays data of the organization; and
    wherein the data description sent including the graphical format includes, nodes containing the metadata and a relationship of the metadata, and the nodes are color coded with different colors representing at least standard metadata, custom metadata, standard relationship and custom relationship, the metadata being retrieved from a location at which the metadata is updated in real time, and next to each node, number is displayed representing how many child nodes are associated with each node if information has been retrieved which allows a number of child nodes to be determined and next to nodes for which information has not been retrieved allowing a number of child nodes to be determined, a question mark is displayed.

14. The method of claim 1, wherein the database is in a multi-tenant database system.

15. A machine comprising:

nontransitory machine readable media, storing thereon one or more instructions for implementing a web application that includes one or more instructions that cause the processor system to perform a method including at least:

sending from a host system, a page with a user interface having an input area that receives input data related to an identity of an entity object, the entity object being one of a collection of objects that perform database related activities, the entity objects in the collection facilitate writing code for performing the database related activities without having to interact with the database directly, the host system including one or more machines including a processor system having at least one or more processors and a memory system that stores the database, and metadata associated with the entity object;

receiving, by the host system, the page with the selection of the entity object;

retrieving, by the processor system, metadata of a set of one or more entity objects from the collection based on the input data related to the identity; and sending, from the host system, a data description of at least one of the entity object associated with the entity object including at least the metadata of the entity object.

16. A nontransitory machine-readable medium carrying one or more sequences of instructions for implementing a method for providing an interface for object relationships, the method comprising:

sending from a host system, a page with a user interface having an input area that receives input data related to an identity of an entity object, the entity object being one of a collection of objects that perform database related activities, the entity objects in the collection facilitate writing code for performing the database related activities without having to interact with the database directly, the host system including one or more machines including a processor system having at least one or more processors and a memory system that stores the database, and metadata associated with the entity object;

receiving, by the host system, the page with the selection of the entity object;

retrieving, by the processor system, metadata of a set of one or more entity objects from the collection based on the input data related to the identity; and sending, from the host system, a data description of at least one of the entity object associated with the entity object including at least the metadata of the entity object.

* * * * *